US006725765B1

(12) United States Patent
Mendenhall

(10) Patent No.: US 6,725,765 B1
(45) Date of Patent: Apr. 27, 2004

(54) CUTTER BLADE ASSEMBLY FOR CUTTING VEGETABLE PRODUCTS

(76) Inventor: George A. Mendenhall, 4252 S. Eagleson Rd., Boise, ID (US) 83705

( * ) Notice: Subject to any disclaimer, the term of this patent is extended or adjusted under 35 U.S.C. 154(b) by 0 days.

(21) Appl. No.: 10/340,466

(22) Filed: Jan. 10, 2003

(51) Int. Cl.[7] ............................ A23L 1/00; A47J 25/00; B26D 1/03; B26D 7/20

(52) U.S. Cl. ............................ 99/537; 99/538; 99/543; 99/545; 83/98; 83/402; 83/425.1; 83/856; 83/865; 83/932

(58) Field of Search ........................... 99/537–541, 545, 99/544, 543, 542, 516, 534–536, 584, 588, 589, 591; 83/22, 24, 47, 112, 402, 425.1, 425.3, 425.2, 856–858, 98, 404.3, 663, 62, 932, 522.12, 62.1, 865, 356.1, 356.3, 422; 125/13.02, 15; 426/481, 482, 518–520

(56) References Cited

U.S. PATENT DOCUMENTS

| | | | | | |
|---|---|---|---|---|---|
| 3,109,468 | A | * | 11/1963 | Lamb et al. | 99/537 |
| 3,116,772 | A | * | 1/1964 | Lamb et al. | 83/27 |
| 3,366,151 | A | * | 1/1968 | Barrett | 99/537 |
| 4,082,024 | A | * | 4/1978 | Hodges et al. | 83/402 |
| 4,135,002 | A | * | 1/1979 | Hodges et al. | 426/482 |
| 4,372,184 | A | * | 2/1983 | Fisher et al. | 83/98 |
| 4,423,652 | A | * | 1/1984 | Winslow | 83/24 |
| 4,614,141 | A | * | 9/1986 | Mendenhall et al. | 83/402 |
| 4,807,503 | A | | 2/1989 | Mendenhall | |
| 4,911,045 | A | * | 3/1990 | Mendenhall | 99/537 |
| 5,010,796 | A | * | 4/1991 | Mendenhall | 83/865 |
| 5,058,478 | A | | 10/1991 | Mendenhall | |
| 5,095,794 | A | | 3/1992 | Mendenhall | |
| 5,097,735 | A | * | 3/1992 | Mendenhall | 83/865 |
| 5,125,308 | A | | 6/1992 | Mendenhall | |
| 5,235,960 | A | | 8/1993 | Malcok | |
| 5,303,687 | A | | 4/1994 | Steere | |
| 5,390,590 | A | * | 2/1995 | Mendenhall | 99/537 |
| 5,655,428 | A | | 8/1997 | Cockburn et al. | |
| 5,904,083 | A | | 5/1999 | Jensen et al. | |
| 6,047,625 | A | | 4/2000 | Mendenhall | |

* cited by examiner

*Primary Examiner*—Timothy F. Simone
(74) *Attorney, Agent, or Firm*—Frank J. Dykas; Robert L. Shaver; Stephen M. Nipper

(57) ABSTRACT

An improved cutter blade assembly for cutting vegetable products such as potatoes. The cutter blade assembly utilizes a number of cutter blades that transverse an axial bore through which products to be cut are fed. These blades are locked within the assembly by an attachment system that partially deforms the blade to hold the blade in place. This improved attachment connection system serves to hold the blade in a position having higher tension and thereby reduces wear, chatter, and feathering.

23 Claims, 4 Drawing Sheets

CUTTER BLADE ASSEMBLY FOR CUTTING VEGETABLE PRODUCTS

BACKGROUND OF THE INVENTION

1. Field of the Invention

This invention relates to cutting blade assemblies for hydraulic food cutting apparatuses and more particularly to a cutter blade assembly for hydraulic food cutting apparatuses that provide for better cutting results, higher quality products, and reduced damage to the cutting blade assembly.

2. Background of the Invention

Many food products, particularly vegetables and fruits, are processed prior to sale either by canning or freezing. Unless the product involved is of a naturally occurring edible size, for example peas, the product is usually trimmed and sliced or diced, to an edible size prior to preservation processing (such as canning or freezing). These slicing, dicing and other cutting operations have traditionally been accomplished with mechanical cutters. However, relatively recent advances in food product cutting technologies have resulted in the common use of hydraulic cutting apparatuses, which can be used to cut relatively large quantities of food product at very high speeds.

In a typical hydraulic cutting apparatus wherein potatoes are to be cut, the potatoes are dropped into a tank filled with water. They are then pumped through a conduit into an alignment chute wherein the potatoes are aligned and accelerated to high speeds before impinging upon a cutter blade assembly where the potato is cut into a plurality of smaller pieces. Hydraulic cutting apparatuses, or as they are known in the trade, hydroknives, can be utilized to cut extremely high volumes of potatoes if the potatoes can be properly aligned and accelerated to high speeds immediately prior to impact with the cutter blade assembly.

Quite obviously, there are a variety of applications for hydraulic cutter knives other than just for potatoes. Some of these include cutting beets, pickles, carrots, apples, pineapples and literally a host of other edible food products.

Typical cutter blade assemblies are shown in U.S. Pat. No. 5,058,478 (Mendenhall), U.S. Pat. No. 5,095,794 (Mendenhall), and U.S. Pat. No. 5,125,308 (Mendenhall). Such cutter blade assemblies are constructed from a front inlet adapter plate having an inner longitudinal passageway there through and shaped to form a generally conical converger. Pyramidal knife supports are attached in opposing pairs around the conical converger to the back of the front inlet adapter plate to form a pyramidal frame. A plurality of knives are attached in a staggered, generally perpendicular, arrangement to form a sequential cutting grid.

As potatoes or other vegetables are processed by passing through the cutting blade assembly, a variety of events take place. Ideally, the potatoes align correctly, pass through without turbulence or interruption, and produce products with straight clean-cut edges that have the desired shape. This, however, is the ideal and in reality a variety of complications and variances take place. First, wearing of the blades in the cutter assembly is a natural phenomenon and results in the blades becoming dull, removed from proper alignment, and deformed. In addition, the force of impact of the potatoes being cut against the blade cutter assembly can cause the holding portion of the blades to be moved and can result in the loss of tension between the blades. In addition, the force of impact of some of the product can cause the blades to be displaced from their proper alignment and orientation and can cause the spacing between the blades to be compressed. This phenomenon is further exacerbated when the flow material through the tube produces turbulence or causes the vegetable matter to impact against the cutter blades in a way other than the way is intended to produce the desired cutting results.

These factors can result in damage to the equipment as well as inferior cut products. As the cutting blades become worn, less tensioned, and out of alignment, the products that are to be cut often times break or tear. As a result, the products produced tend to be of a lesser quality than is desired and are therefore less economically and commercially valuable.

Blade chatter is the designation given to the phenomena that occurs when the blades in a cutting assembly lose tension and begin to wobble and vibrate. Blade chatter is frequently a concern in the design and use of cutter blade assemblies. Using blades which are too thin, feeding too high of a volume of vegetable mater through the blade assembly, and/or blade wear all can result in chatter. Chatter results in a lower quality cutting of the vegetable matter and increases the chance of breakage of the assembly.

As mentioned above, blade wear can be a source of chatter. For instance, the blades shown in U.S. Pat. No. 5,904,083 (Jensen et al.) are attached to the assembly frame through use of bolts that extend through holes formed within the blades. The stress of vegetable material being forced against the center of the blade forces the blade to be partially deformed and stretched and for the holes which surround the bolts to be elongated. As the metal wears, the cutting portion is stretched and these holes enlarge. When this occurs, the blades lose tension and can no longer be held taught. These loose blades will then vibrate and chatter will result.

U.S. Pat. No. 6,047,625 (Mendenhall) discloses an improved blade apparatus including a blade tensioning means made up of an adjustment screw (within the blade mount) that bears against a roll pin, which, in turn, pushes a portion of the blade around a pair of anvils into a recess. The result is a blade assembly having tension that can be adjusted, by tightening and loosening the adjustment screw, thereby allowing a user to compensate for wear by adjusting the blade to maintain tension. While this is effective in maintaining tension on the blade, the tension is only held in a strong position as long as the portions of the cutting blade that surround the holes through which the blades pass are held in place. When these portions wear, the blade becomes loose and chatter becomes a problem because the blade is not adequately anchored.

Therefore, what is needed is an improved device for anchoring a blade within a blade mount thereby reducing vibration and “chatter” of the saw blades. What is also needed is an improved device for adjustably tensioning of a cutting blade in a hydraulic cutting apparatus. Embodiments of the present invention satisfy these needs.

What is also needed is an anti-compression stabilizer ring for locking pyramidal knife supports in place thereby preventing these pyramidal knife supports from moving when blades are tensioned, as well as supporting the cutter blade assembly when impacted by an item of food to be cut. Embodiments of the present invention satisfy this need.

What is also needed is a flow alignment control tube for lining the blade assembly and for promoting laminar flow of material through the cutter assembly, reducing turbulence within the liquid carrier medium, and reducing product breakage as the product is pushed through the blades of the assembly. Embodiments of the present invention satisfy this need.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is an improved cutter assembly for cutting vegetable matter in a hydraulic cutting apparatus or hydroknife. In one of the preferred embodiments, this cutter assembly comprises a body having an axial bore through which material to be cut transits, at least one elongate blade crossing said axial bore, and an anchoring and tensioning apparatus for mounting the elongate blade(s) to the body.

The body further has a first blade mounting surface and a second blade mounting surface for receiving the first and second ends of a blade having a width. The body has surfaces defining a first recess underlying a portion of the first blade. This first recess has a width preferably at least as great as the width of the blade. A second recess is likewise presented within the first blade mounting surface and also underlies a portion of the blade. This second recess also preferably has a width at least as great as the width of the blade. A third recess is provided within a second blade mounting surface underlying a portion of the blade. This third recess has a width preferably at least as great as the width of the blade.

A first blade clamp is provided for mounting the blade first end portion to the first blade-mounting surface. This first blade clamp has a first crimping flange configured to lock a portion of the first blade into the second recess. Likewise, a second blade clamp is provided for mounting the blade second end portion to the second blade mounting surface. This second blade clamp having a second crimping flange configured for locking a portion of the first blade into the third recess.

The blade is held in a position by the first and second blade mounting surfaces of the body whereby a cutting portion of the blade body passes across the axial bore of the body. In use in a hydraulic cutting apparatus, this axial bore will provide a passageway through which products to be cut will pass. The portion of the blade that transverses this axial bore provides a cutting surface for cutting these materials. The first and second blade mounting surfaces are configured to work in conjunction with the first and second blade mounting clamps along with traditional type fasteners, i.e. bolts and screws, to hold the blades in place in a position which is more secure and tightly anchored than those found in the prior art. This results in less vibration, flexing or variation of the cutting blade when impacted by items to be cut and lengthens the useful life of the blades in the cutter. By reducing these undesired characteristics, the present invention allows a cutter blade assembly to produce higher quality product at a more efficient cost.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment is to be regarded as illustrative in nature, and not as restrictive.

DESCRIPTION OF THE PREFERRED EMBODIMENTS

Figure 1:
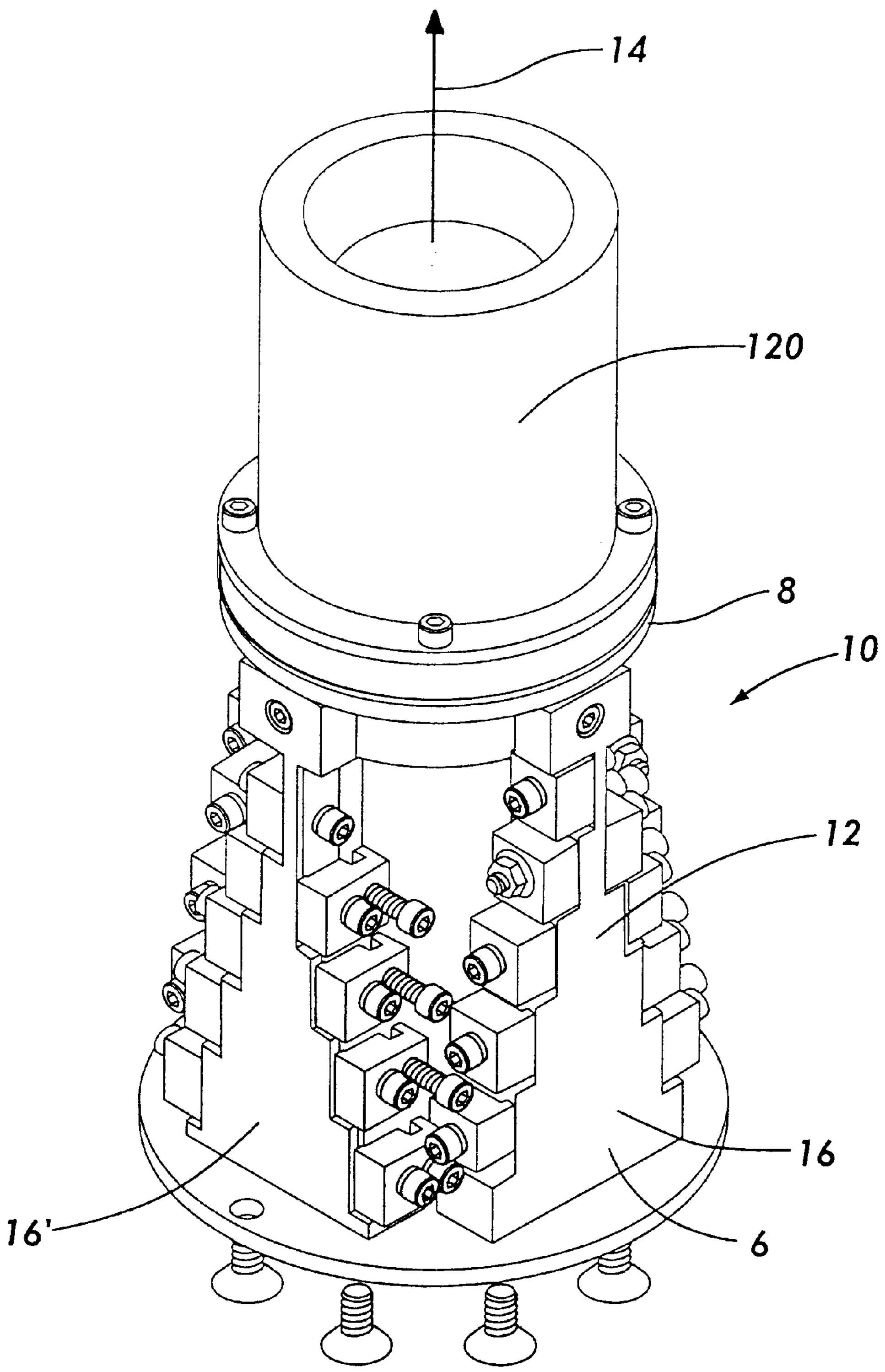
FIG. 1 is a perspective view of one embodiment of a cutter blade assembly of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

A general description of the equipment necessary to cut and process raw potatoes into a desired shape is described in U.S. Pat. No. 4,807,503 (Mendenhall), the disclosure of which is incorporated herein by reference. As shown in that patent's FIG. 1, raw whole potatoes (17) are dumped into a water filled receiving tank (13). A food pump (14), usually a single impeller centrifugal pump, draws its suction from receiving tank (13), and pumps water and the suspended potatoes (17) from the tank into nozzle gun (11). The nozzle gun (11) functions as a venturi, which is used to accelerate and align potatoes (17) immediately prior to impinging upon the knives of a cutter blade assembly (10). The cutter blade assembly (10) thus cuts the potatoes into the desired shapes and sizes. The cut pieces (19) then enter into deceleration loop (18) which in effect is the second half of the venturi. The deceleration loop returns to a point above receiving tank (13) where the water and cut pieces (19) are deposited onto chain separator (20). The water passes through chain separator and returns to receiving tank. Chain separator is typically an endless loop chain or dewatering shaker, which is used to mechanically remove the cut pieces from the hydraulic cutting apparatus assembly.

Figure 2:
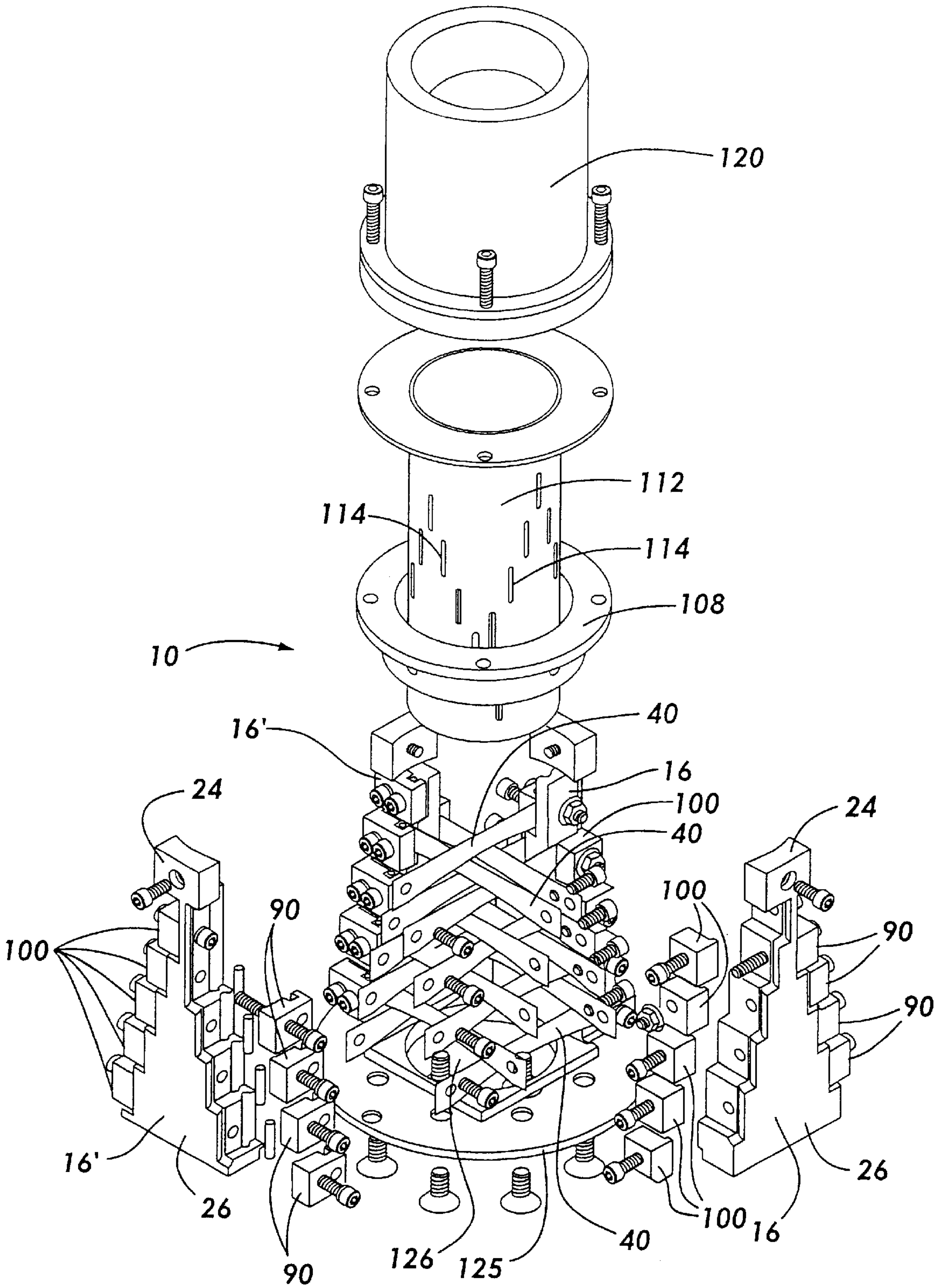
FIG. 2 is an exploded, perspective view of the embodiment of FIG. 1.
Figure 3:
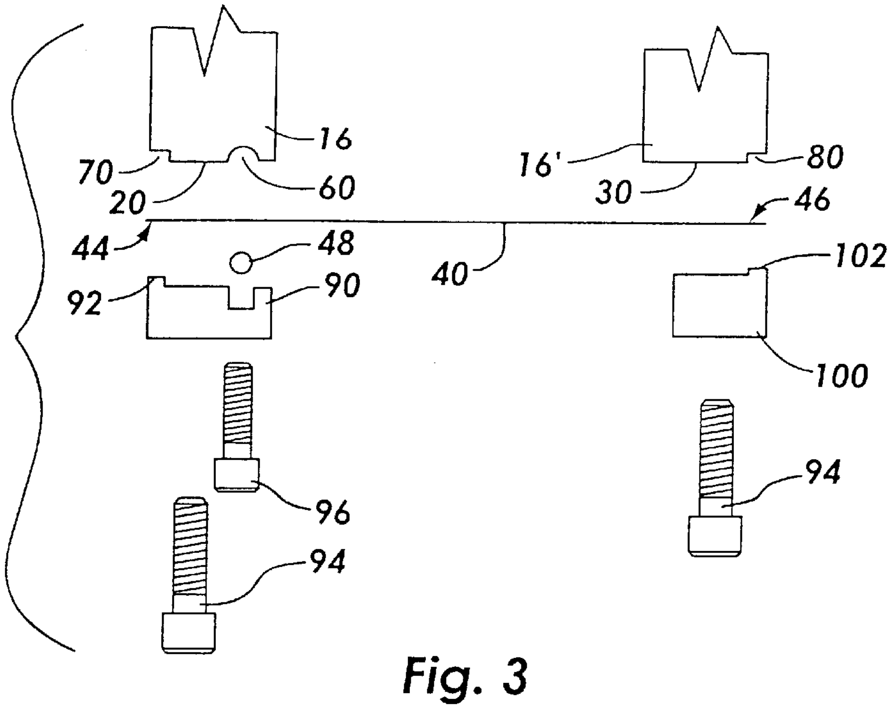
FIG. 3 is a top view of the preferred embodiment of the present invention prior to attachment to the blade mounting device.

Referring initially to FIGS. 1 and 2 of the present disclosure, one embodiment of the present invention is shown. The present invention is an improved cutter blade assembly for cutting vegetable products such as potatoes. The cutter blade assembly 10 has a body 12 that defines an axial bore 14. The body 12 has a first end 6 extending to a second end 8. Between the first end 6 and the second end 8, the body 12 has a plurality of attachments that are configured to connect with blades (shown in FIG. 2) which cut material passing though the cutter from the first end 6. In this embodiment, the body 12 is made up of pairs of tensioning trees 16, 16'. The first end 6 of the device is configured for attachment to a product source such as a nozzle gun shown in the prior patent ('503). The second end 8 is configured for attachment to a venturi cap 120, which leads material from the cutting assembly into the deceleration loop described in the '503 patent.

FIG. 2 shows an exploded, perspective view of the embodiment shown in FIG. 1. The cutter blade assembly 10 is shown resting upon a front inlet adapter plate 125. In use, the cutter blade assembly 10 and the adapter plate 125 would be connected and oriented so as to receive vegetable matter in a carrier medium through a receiving opening 126 in the front inlet adapter plate 125. After passing through the receiving opening 126 in the front inlet adapter plate 125, the vegetable matter travels generally along the longitudinal centerline of the cutter blade assembly 10 through a staggered array of cutting knives 40 before exiting the cutter blade assembly 10 in pieces near the second end 8 of the cutter assembly 10 (FIG. 1).

In the preferred embodiment of the present invention, the cutter blade apparatus ("cutter") 10 has a body 12, which is configured for placement about the opening 126 in the front adapter plate 125 and defines a first axial bore 14 there through. In use, vegetable matter to be cut passes through this axial bore 14. A number of elongated blades 40 are mounted to the body 12 and are configured and placed so as to intersect a path of travel of a product through the axial bore 14. The blades 40 are preferably arranged in a criss-crossing pattern and provide spaces between the blades 40 that define a desired cross-sectional pattern for the vegetable pieces to be produced. As vegetable material passes through the cutting assembly 10, the impact of the vegetable material against the blades 40 results in the vegetable material being cut into pieces having the cross section defined by the spaces between the blades 40.

In the embodiment shown, the blades 40 do not interlock, but obtain rigidity and cut integrity through tensioning. The preferred blades 40 are relatively thin having a thickness of only 0.008 inches. This reduces the amount of material wasted by the cutting blades 40 and improves the overall functioning of the device. By stacking without interlocking, there is no unequal friction to cause separation of vegetable matter at the junction of the blade intersection. Thus, the blades 40 cut rather than tear the material. This results in a higher quality product without the problems of so-called shattering or feathering. It is preferred that the elongated blades 40 be oriented generally perpendicular to the axial bore 14, however angular intersections are also envisioned within the scope of this invention.

The body or "blade-mounting device" 12 of the cutter 10 is configured to attach to the front inlet adapter plate 125. This front inlet adapter plate 125 is configured for mounting the cutting blade assembly 10 within the processing equipment used to process and cut the vegetable matter. Preferably, this is done by connecting the front adapter plate 125 to a nozzle gun. The front adapter plate 125 is also configured to connect with the blade mounting device 12. In the embodiment shown, the blade mounting device 12 comprises a plurality of tension trees 16, 16' attaching to and extending generally perpendicular from the adapter plate 125. These tension trees 16, 16' are configured to be mounted to the adapter plate 125 through the use of a fastener such as a plurality of screws or bolts which attach to the bottoms or bases 26 of the trees 16, 16'.

In the embodiment shown in FIGS. 1 and 2, four tension trees 16, 16, 16', 16' are provided. These tension trees comprising two sets of opposing pairs. Parallel sides of opposing pairs of tension trees provide first blade mounting surfaces 20 and second blade mounting surfaces 30 for mounting the elongated blades 40 there between. The blades 40 are connected to the first blade mounting surfaces 20 and the second blade mounting surfaces 30 through use of first blade clamps 90 and second blade clamps 100, which are held in place by fasteners such as screws and/or bolts. Detailed views of the connection between the blade 40 and the first and second blade mounting surfaces 20, 30 are shown in FIGS. 3, 4, 5, and 6 and will discussed later in detail.

A tension cap or "anti-compression stabilizer ring" 108 interconnects the tops of the trees 16, 16' thereby holding the tops of the trees 16,16' a fixed or spaced distance apart. This keeps the tops of the tension trees 16, 16' from tilting in towards the center of the axial bore 14 when tension is applied to the blades 40, and when the blades 40 are impacted by the vegetable being cut by the blades. It is preferred that the tops 24 of the tension trees 16, 16' be configured to connect with the stabilizer ring 108 through the use of a fastener, i.e. a screw or bolt.

The flow of material through the cutter 10 is enhanced by a flow control sleeve or "flow alignment control tube" 112 having a plurality of blade insertion slots 114 defined within it. The flow alignment control tube 112 is inserted within the axial bore 14 to increase the laminar flow of material through the tension cutter 10 and to reduce the amount of turbulence and interference that occurs therein. The blade insertion slots 114 are configured to allow portions of the elongated blades 40 to pass there through and to form a cutting pattern within the axial bore 14. By containing the flow of liquid and material to be cut within the flow tube 112, the amount of turbulence within the liquid is reduced as is the amount of tension against the blade 40 caused by turbulence. The flow tube 112 also assists the vegetable material being cut to be funneled and channeled in the same direction thus allowing the cutting blade assembly 10 to function more efficiently.

It is also preferred that a venturi cap 120 be mounted to the top of the trees 16, 16' to compress the flow of liquid and material out of the cutting assembly 10. The venturi cap 120 also assists to keep the cut strips of vegetable matter together in a mass as they exit the cutter 10. This reduces the number of vegetable pieces that are off-cut, broken, or damaged, and keeps these pieces together as they exit the cutter 10. This translates into a reduction in the number of less commercially valuable pieces and an increase in the number of high quality and commercially valuable pieces being produced.

Referring now to FIGS. 3–6, detailed views of the connection between the blades 40 and the tension trees 16, 16' is shown. The preferred elongated blade 40 has a width 17, a first end portion 44, and a second end portion 46. The first end portion 44 is configured for connection with the first blade mounting surface 20 of the first tree 16 and the second end portion 46 configured for mounting to the second blade mounting surface 30 of the second tree 16'. As shown in the figures, some trees 16, 16' may contain both first and second blade mounting surfaces. Likewise, any combination of first and second blade mounting surfaces may be present on any given tree.

A first end 44 of a blade 40 is configured to be connected to a first blade mounting surface 20 by a first blade clamp 90. A mounting fastener 94 is utilized to attach the first blade clamp 90 and the first end portion 44 of the blade to the first mounting surface 20 through a mounting hole 50 located in the first end portion 44 of the elongated blade 40. Likewise, a second mounting fastener 94 is utilized to attach a second blade clamp 100 and a second end portion 46 of the elongated blade 40 to the second mounting surface 30 through a second mounting hole 50 located in the second end portion 46 of the elongated blade 40. The mounting fastener 94 is configured to be adjustable so as to compress the end portions of the elongated blade 44, 46 between the blade clamps 90, 100 and the mounting surfaces 20, 30.

When the first end portion 44 of the elongated blade 40 is pressed between the first blade clamp 90 and the first mounting surface 20, the blade 40 is deformed and anchored in place by compression between a first crimping flange 92 on the first blade clamp and a correspondingly configured first recess 70 on the first mounting surface 20. Likewise, when the second end portion 46 of the elongated blade 40 is pressed between the second blade clamp 100 and the second mounting surface 30, the blade 40 is deformed and anchored in placed by compression between a second crimping flange 102 and correspondingly configured second recess 80 defined within the second mounting surface 30. Then, after such a connection, the end portions 44, 46 of the elongated blade 40 are crimped so as to form a first crimp 52 on the first end portion 44 and a second crimp 54 near the second end portion of the blade 46.

Figure 4:
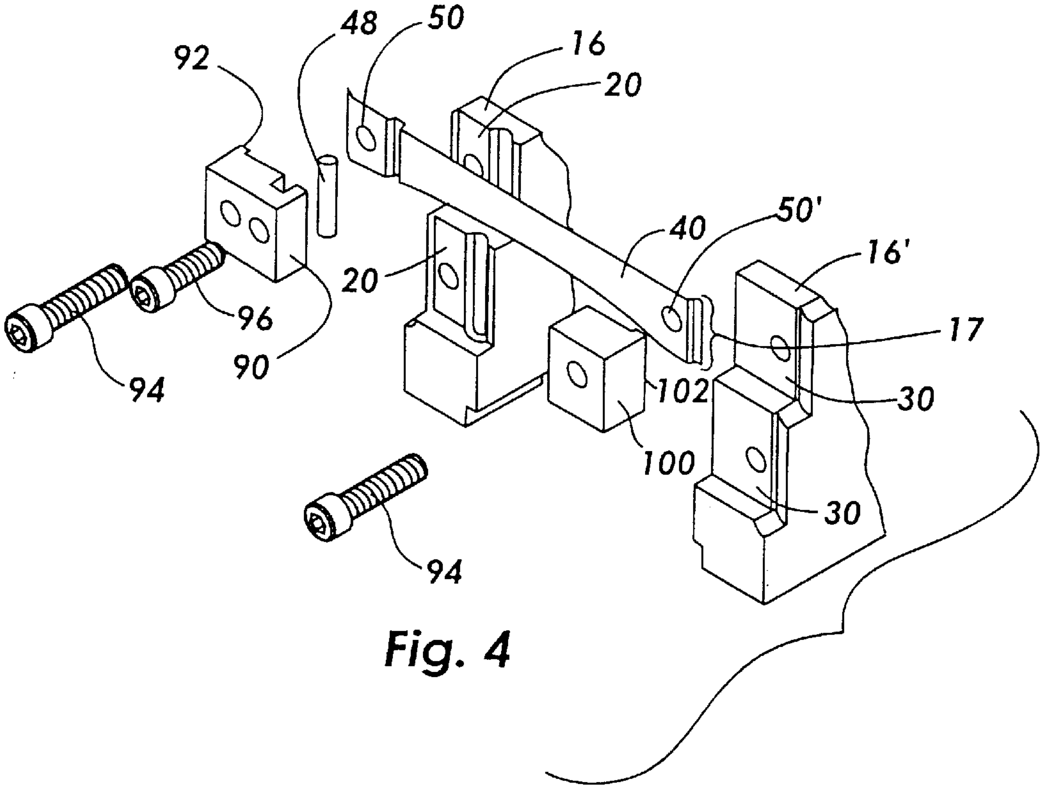
FIG. 4 is a partial, perspective, exploded, side view particularly showing the crimped shape of a blade after it has been attached to the present invention.
Figure 5:
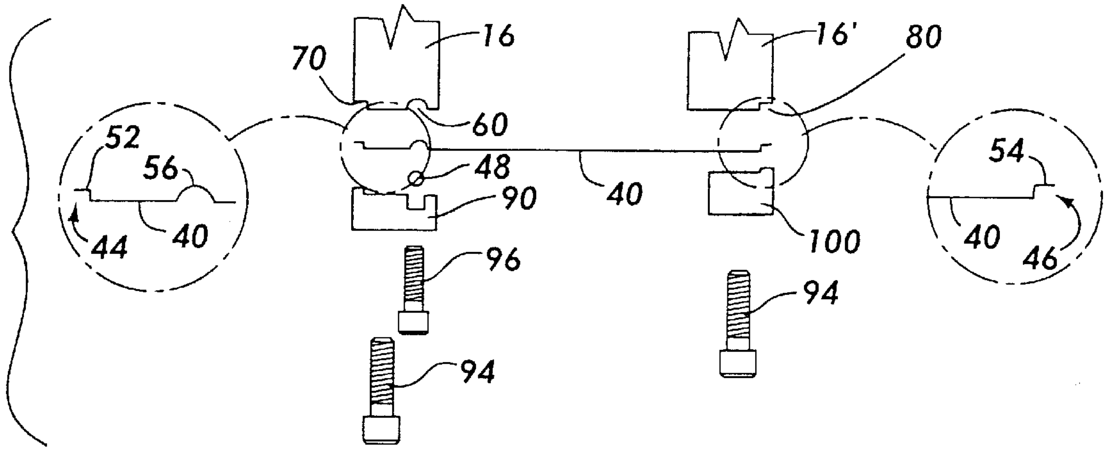
FIG. 5 is a top view of the embodiment shown in FIG. 4.

A perspective assembly view of the blade 40 with the resulting crimps 52, 54 is shown in FIG. 4, and a detailed, top view of the resulting crimps in the blade is shown in FIG. 5.

These crimped portions 52, 54 provide for increased surface area and interaction between the clamping mechanism 20, 30, 90, 100 and the end portions of the blade 44, 46. By providing increased area and support to the blade 40, the force of impact from vegetable matter along the blade 40 is dispersed along a broader area and less impact is absorbed by the blade portions nearest the mounting holes 50, 50'. As a result, less fatigue of the blade 40 results, particularly in the area nearest the mounting holes of the blade, and the blade 40 remains tighter and in a desired position for a longer period of time.

The ability of the blade 40 to maintain tension can be further facilitated by the presence of a blade tensioner 110 formed and configured for connection with the first mounting surface and the first mounting clamp 90. While the following description is described in the context of the first mounting clamping 90 and surface mounting portions 20, it is to be distinctly understood that such a description is not to be limited thereto but may be equally applied to the second clamping 100 and mounting structure 30 and surfaces.

The blade tensioner 110 functions to maintain tension upon the blade 40 by providing an adjustable tensioning bolt 96 that is configured to pass through a first clamping device 90 and engage a tensioning dowel pin 48. This dowel pin 48 is configured to interfit with a tensioning recess 60 that is formed within the first mounting surface 20. By tightening the adjustable tensioning bolt 96, the dowel pin 48 pushes blade 40 into the tensioning recess 60 and increases the tension on the elongated blade 40 between the first and second clamps 90, 100, and the first and second mounting surfaces 20, 30. This procedure enables a user of the device to adjust and maintain the cutting blades 40 on a cutting apparatus 10 in proper tension and alignment in order to provide maximum results.

Figure 6:
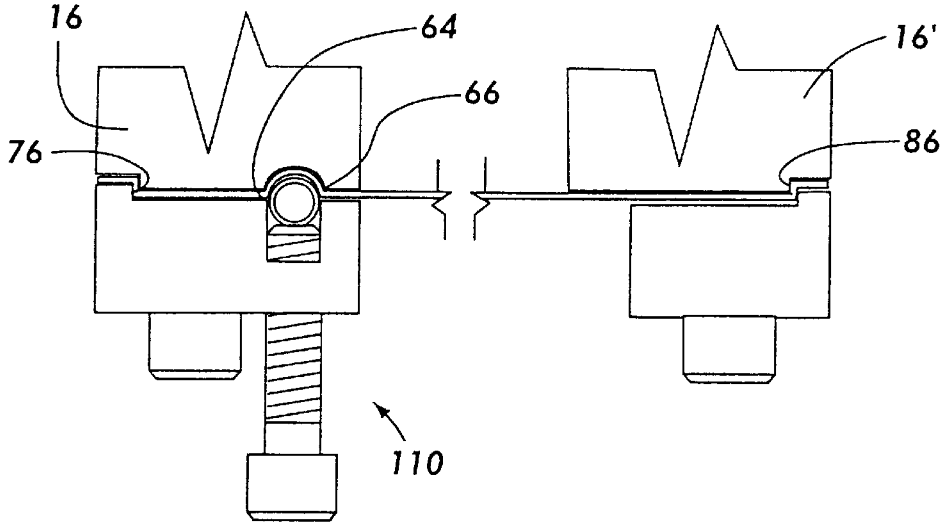
FIG. 6 is a partial, top, detailed view of the present invention showing the connection between the blade and the blade mounting devices and the tensioning pin of the present invention.

Referring specifically now to FIGS. 5 and 6, the preferred embodiment of the present invention, in use, clamps down the end portion of the blade 44, 46 thereby inhibiting the ability of the blade to stretch when impacted, thus reducing the likelihood that the blade's mounting holes will be deformed from their original circular shape. The result is a blade that maintains its tension better, thereby resulting in less chatter and less feathered product.

While in the preferred embodiment, a right angled step that extends the entire width of the blade is formed into each of the ends of the blade, any and all other manner of deforming portions of the blade so as to laterally lock the blade are equivalents.

FIG. 6 shows a preferred embodiment of the blade tensioning mechanism 110.

When engaged, the tensioning bolt 96 is manipulated inwardly against a roll or "dowel" pin 48, which in turn urges blade 40 around blade tension anvils 64 and 66 and into the tensioning recess 60 of the first blade mounting surface 20. Blade tension roll pin 48 preferably extends the full width of the blade 40, and is of a sufficiently large radius to avoid unduly high bending stresses in the blade 40 at the point of contact with the roll pin 48. Blade tension anvils 64, 66 are also rounded in the preferred embodiment to minimize stress concentrations in blade 40, which if unchecked could lead to premature failure of the blade. Although rounded roll pins 48 and tension anvils 64, 66 tend to extend blade life, the invention is not limited thereto, and other profiles could be employed for the roll pin 48 and tension anvils 64, 66 without departing from the scope of the invention.

Through utilization of the present invention, a first crimp 52 is created within the first end portion 44 of the blade by contact with a first anvil portion 76 of the first mounting surface 20 and a second crimp 54 is created within the second end portion 46 of the blade by contact with the second anvil portion 86. In doing so, the mounting holes 50, 50' are less likely to be elongated through use thereby helping the blade maintain its original length, thereby reducing chatter. When used in combination with a blade tensioner 10, as shown, the tension upon the blades can be maintained and feathering and chatter reduced.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A cutter assembly for cutting vegetable pieces in a hydraulic cutter assembly comprising:

a first body having first and second blade mounting surfaces and defining a first axial bore; and a first blade traversing said bore, said first blade having a first end and a second end, said first end configured to be connected to said first blade mounting surface and a second end configured to be connected to said second blade mounting surface;

said first blade mounting surface defining a portion configured to interact with a holding device to deform and hold a portion of said blade against said first mounting surface when said blade is held in compressive engagement between said holding device and said first mounting surface by a fastener.

2. The cutter assembly of claim 1 wherein said second mounting surface defines a portion configured to interact with a holding device to deform and hold a portion of said blade against said second mounting surface.

3. The cutter assembly of claim 2 wherein said first mounting surface and said second mounting surface each define at least one recess configured to interact with a portion of a correspondingly configured portion of a holding device to deform and hold a portion of said blade.

4. The cutter assembly of claim 2 further comprising a tensioning mechanism configured to adjustably maintain a desired level of tension upon said elongated blade.

5. The cutter of assembly of claim 4 wherein said tensioning mechanism is comprised of an adjustable screw held in compressive engagement against a tensioning dowel pin within a holding clamp, said holding clamp configured to hold said tensioning dowel against said blade and to advance a portion of said blade into a tensioning recess formed within said first mounting surface.

6. The cutter assembly of claim 1 wherein said holding device is a holding clamp, said clamp having a portion adapted to receive an adjustably tensioning fastener there through, said clamp further comprising a crimping flange configured to deform and hold a portion of said blade within a portion of said first mounting surface.

7. The cutter assembly of claim 1 wherein said first mounting surface defines a recess and an anvil, said recess and said anvil each configured to deform a portion of said blade when said blade is placed in compressive engagement between said first mounting surface, and a holding clamp having portions configured to correspondingly interfit with said first mounting surface.

8. The cutter assembly of claim 7 wherein said first mounting surface recess is configured to correspondingly interfit with the crimping flange of the holding clamp, and wherein said crimping flange, said recess and said anvil engage and deform portions of said blade when said blade is held in compressive engagement between said holding clamp and said first mounting surface.

9. The cutter assembly of claim 2 wherein said second mounting surface defines a recess and an anvil said recess and said anvil each configured to deform a portion of said blade when said blade is placed in compressive engagement between said first mounting surface and a holding clamp having portions configured to correspondingly interfit with said first mounting surface.

10. The cutter assembly of claim 9 wherein said first mounting surface recess is configured to correspondingly interfit with the crimping flange of the holding clamp, and wherein said crimping flange, said recess and said anvil engage and deform portions of said blade when said blade is held in compressive engagement between said holding clamp and said first mounting surface.

11. A cutter assembly for cutting vegetable pieces in a hydraulic cutter assembly comprising:

at least two bodies, each body having a plurality of first blade mounting surfaces and a plurality of second blade mounting surface, and defining between said bodies an axial bore; and a plurality of blades traversing said bore, each of said blades having a first end and a second end, each of said first ends connected to a first blade mounting surface and each of said second ends connected to a second blade mounting surface;

each of said first and second mounting surfaces defining a recess configured to interact with a crimping flange portion of a holding device to deform and hold a portion of said blade against said mounting surfaces when said blade is held in compressive engagement between said holding devices and said mounting surfaces by a fastener.

12. The cutter assembly of claim 11 further comprising a tensioning mechanism configured to adjustably maintain a desired level of tension upon said elongated blade.

13. The cutter of assembly of claim 12 wherein said tensioning mechanism is comprised of an adjustable screw held in compressive engagement against a tensioning dowel pin within a holding clamp, said holding clamp configured to hold said tensioning dowel against said blade and to advance a portion of said blade into a tensioning recess formed within a mounting surface.

14. The cutter assembly of claim 11 further comprising a flow tube within said axial bore said flow tube defining a plurality of apertures therein, said apertures configured to allow passage of said blades through said flow tube and across said axial bore.

15. The cutter assembly of claim 11 further comprising a compression ring connected to said bodies, said compression ring configured to allow passage of cut materials out of said cutter assembly along said bore as well as to maintain a desired distance between said bodies about said axial bore.

16. The cutter assembly of claim 11 further comprising two additional bodies each additional body having a plurality of first and second blade mounting surfaces, said bodies and said plurality of blades configured so that said blades are generally perpendicularly arranged.

17. The cutter assembly of claims 11 wherein said generally perpendicularly oriented blades do not interfit with one another.

18. The cutter assembly of claim 11 wherein said holding device is a holding clamp, said clamp having a portion adapted to receive an adjustably tensioning fastener there through, said clamp further comprising a crimping flange configured to interact with a portion of said mounting surface to deform and hold a portion of said blade within a portion of said first mounting surface.

19. The cutter assembly of claim 11 herein said first and second mounting surfaces each define a recess and an anvil, said recess and said anvil each configured to deform a portion of said blade when said blade is placed in compressive engagement between said first mounting surface, and a holding clamp having portions configured to correspondingly interfit with said first mounting surface.

20. An improved cutter assembly configured for cutting vegetable pieces in a hydraulic cutter assembly comprising:

a plurality of tensioning trees spatially arranged in opposing pairs and defining between them an axial bore configured for passage of materials to be cut there through, each tree having a plurality of first blade mounting surfaces and a plurality of second blade mounting surfaces;

a flow alignment control tube configured to be placed within said axial bore;

a plurality of blades traversing said bore in a non-interfitting generally perpendicular pattern, each of said blades having a first end and a second end, each of said first ends connected to a first blade mounting surface and each of said second ends connected to a second blade mounting surface each of said first and second mounting surfaces define a recess and an anvil both the recess and the anvil configured to interact with a crimping flange portion of a holding clamp to deform and hold a portion of said blade against said mounting surfaces when said blade is held in compressive engagement between one of said holding devices and said mounting surfaces by a fastener;

a tensioning mechanism configured to adjustably maintain a desired level of tension upon said elongated blade, said tensioning mechanism is comprised of an adjustable screw held in compressive engagement against a tensioning dowel pin within a holding clamp, said holding clamp configured to hold said tensioning dowel against said blade and to advance a portion of said blade into a tensioning recess formed within a mounting surface;

a compression ring connected to said bodies, said compression ring configured to allow passage of cut materials out of said cutter assembly along said bore as well as to maintain a desired distance between said bodies about said axial bore.

21. A cutter comprising:

a first body having a first axial bore, a first blade mounting surface and a second blade mounting surface;

a first elongate blade traversing said bore, said first elongate blade having a first width and having first and second end portions configured for attachment to the respective first and second blade mounting surfaces;

said first body having surfaces defining a first recess underlying a portion of said first blade, a second recess within said first blade mounting surface underlying a portion of said first blade, and a third recess within said second blade mounting surface underlying a portion of said first blade;

a first blade clamp for mounting said blade first end portion to said first blade mounting surface, said first blade clamp having a first crimping flange configured for locking a portion of the first blade into said second recess;

a second blade clamp for mounting said blade second end portion to said second blade mounting surface, said second blade clamp having a second crimping flange configured for locking a portion of said first blade into said third recess; and a first blade tensioner configured for urging a portion of said first blade into said first recess.

22. A cutter comprising:

a first body having a first axial bore, a first blade mounting surface and a second blade mounting surface;

a first elongate blade traversing said bore, said first elongate blade having first and second end portions configured for attachment to the respective first and second blade mounting surfaces;

a first blade clamp for mounting said blade first end portion to said first blade mounting surface;

a second blade clamp for mounting said blade second end portion to said second blade mounting surface;

said first blade clamp configured for attachment to said first blade mounting surface with said elongate blade first end portion held there between, said attachment forming at least one locking flange formed within said elongated blade; and said second blade clamp configured for attachment to said second blade mounting surface with said elongate blade second end portion held there between, said attachment forming at least one locking flange formed within said elongated blade.

23. A cutter comprising:

a first body having a first axial bore and first and second blade mounting surfaces;

a first elongate blade traversing the bore, the first blade having first and second end portions configured for attachment to the respective first and second blade mounting surfaces;

the first body having surfaces defining a first recess within the first blade mounting surface underlying a portion of the first blade, said first body having surfaces defining a second recess within the second blade mounting surface underlying a portion of the first blade;

a first blade clamp for mounting said blade first end portion to said first blade mounting surface, said first blade clamp having a first crimping flange configured for locking a portion of said first end portion of said first blade into said first recess;

a second blade clamp for mounting said blade second end portion to said second blade mounting surface, said second blade clamp having a second crimping flange configured for locking a portion of said second end portion of said first blade into said second recess.

* * * * *